United States Patent
Chatterji et al.

(12)

(10) Patent No.: US 6,966,379 B2
(45) Date of Patent: *Nov. 22, 2005

(54) METHODS OF FRACTURING A SUBTERRANEAN FORMATION USING A PH DEPENDENT FOAMED FRACTURING FLUID

(75) Inventors: Jiten Chatterji, Duncan, OK (US); Karen L. King, Duncan, OK (US); Bobby J. King, Duncan, OK (US); Billy F. Slabaugh, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 139 days.

This patent is subject to a terminal disclaimer.

(21) Appl. No.: 10/683,644

(22) Filed: Oct. 10, 2003

(65) Prior Publication Data

US 2005/0077047 A1 Apr. 14, 2005

(51) Int. Cl.$^7$ .............................................. E21B 43/27
(52) U.S. Cl. ................. 166/308.6; 166/280.1; 166/300; 166/307; 166/309; 507/202; 507/211; 507/216; 507/244; 507/922
(58) Field of Search ............... 166/270.1, 280.1, 166/300, 307, 308.1, 308.2, 308.6, 309, 371; 507/202, 244, 211, 216, 922

(56) References Cited

U.S. PATENT DOCUMENTS

| | | |
|---|---|---|
| 3,303,896 A | 2/1967 | Tillotson et al. |
| 3,572,439 A | 3/1971 | Hutchison et al. |
| 3,610,340 A | 10/1971 | Hutchison et al. |
| 4,108,782 A | 8/1978 | Thompson |
| 4,113,631 A | 9/1978 | Thompson |
| 4,232,741 A | 11/1980 | Richardson et al. |
| 4,301,016 A | 11/1981 | Carriere et al. |
| 4,480,696 A | 11/1984 | Almond et al. ............. 166/308 |
| 4,486,316 A | 12/1984 | Carriere et al. |
| RE32,302 E | 12/1986 | Almond et al. ............. 166/308 |
| 4,627,495 A | 12/1986 | Harris et al. ................ 166/280 |
| 4,664,851 A | 5/1987 | Drent ................... 260/410.9 R |
| 4,694,906 A | 9/1987 | Hutchins et al. |
| 4,809,783 A | 3/1989 | Hollenbeck et al. ........ 166/307 |
| 4,846,277 A * | 7/1989 | Khalil et al. ............. 166/280.1 |
| 4,861,500 A * | 8/1989 | Hodge ......................... 507/203 |
| 5,215,596 A | 6/1993 | Van Slyke |
| 5,373,901 A | 12/1994 | Norman et al. ............. 166/300 |
| 5,385,206 A | 1/1995 | Thomas |
| 5,591,701 A | 1/1997 | Thomas |
| 5,604,186 A | 2/1997 | Hunt et al. .................. 507/204 |
| 5,614,473 A | 3/1997 | Dino et al. |
| 5,990,052 A | 11/1999 | Harris ......................... 507/214 |
| 6,113,809 A | 9/2000 | Dino et al. |
| 6,148,932 A | 11/2000 | Argillier et al. |
| 6,286,601 B1 | 9/2001 | Argillier et al. |
| 6,306,800 B1 | 10/2001 | Samuel et al. |
| 6,357,527 B1 | 3/2002 | Norman et al. ............. 166/300 |
| 6,454,008 B1 | 9/2002 | Chatterji et al. ............ 166/308 |
| 6,460,632 B1 | 10/2002 | Chatterji et al. ............... 175/66 |
| 6,729,408 B2 | 5/2004 | Hinkel et al. ................ 166/308 |
| 6,761,220 B2 | 7/2004 | Blauch et al. |

OTHER PUBLICATIONS

SPE 73730 entitled "High–pH Clay Instability Rating" by Rick Gdanski dated 2002.

SPE 64983 entitled "Impact of Clay Acidity on the pH of invading Fluids" by Rick Gdanski dated 2001.

U.S. Appl. No. 10/396,606, entitled "Recyclable Foamed Fracturing Fluids and Methods of Using the Same," inventors Jiten Chatterji et al., filed Mar. 25, 2003.

* cited by examiner

*Primary Examiner*—Zakiya Walker
(74) *Attorney, Agent, or Firm*—Craig W. Roddy; Conley, Rose, P.C.

(57) ABSTRACT

Methods of fracturing a subterranean formation include providing a fracturing fluid having a first pH. The fracturing fluid may be made by combining a gelling agent, a surfactant, and a proppant. The surfactant is capable of facilitating foaming of the fracturing fluid at the first pH and defoaming of the fracturing fluid when its pH is changed to a second pH. The methods of fracturing the subterranean formation further include foaming the fracturing fluid having the first pH and subsequently pumping it to the subterranean formation to fracture the formation. The pH of the fracturing fluid changes to a second pH, for example via in situ contact with an acidic material, causing the level of foam in the fracturing fluid to be reduced. As a result of the reduction of the foam, the fracturing fluid deposits the proppant into the fractures formed in the subterranean formation.

36 Claims, No Drawings

METHODS OF FRACTURING A SUBTERRANEAN FORMATION USING A PH DEPENDENT FOAMED FRACTURING FLUID

CROSS-REFERENCE TO RELATED APPLICATIONS

The subject matter of the present application is related to copending U.S. patent application Ser. No. 10/396,606, filed Mar. 25, 2003, and entitled "Recyclable Foamed Fracturing Fluids and Methods of Using the Same," which is incorporated by reference herein.

FIELD OF THE INVENTION

This invention generally relates to recovering natural resources from subterranean formations. More specifically, the invention relates to methods of fracturing a subterranean formation using a fracturing fluid that foams and defoams in response to a change in pH.

BACKGROUND OF THE INVENTION

Natural resources such as gas, oil, minerals, and water residing in a subterranean formation can be recovered by drilling wells into the formation. For example, methane can be recovered from subterranean formations comprising of coal beds. The fluids in the subterranean formation are driven into the wells by, for example, pressure gradients that exist between the formation and the wells, the force of gravity, displacement of the fluids using pumps or the force of another fluid injected into the wells. The production of such fluids is commonly increased by hydraulically fracturing the subterranean formations. That is, a viscous fracturing fluid is pumped into a well to a subterranean formation at a rate and a pressure sufficient to form fractures that extend into the formation, providing additional pathways through which the fluids can flow to the wells.

The fracturing fluid is usually a water-based fluid containing a gelling agent to increase the viscosity of the fluid. The gelling agent reduces the leakage of liquid from the fractures into the subterranean formation. The gelling agent is commonly a polymeric material that absorbs water and forms a gel as it undergoes hydration. In addition, particulate matter known as a proppant, e.g., graded sand, bauxite, or resin coated sand, is typically dispersed throughout the fracturing fluid. The proppant is suspended in the fracturing fluid and becomes deposited into the fractures created by the pressure exerted on the fracturing fluid. The presence of the proppant in the fractures holds the fractures open after the pressure has been released. Otherwise, the fractures would close, rendering the fracturing operation useless. Ideally, the proppant has sufficient compressive strength to resist crushing.

Fracturing fluid has been developed for its proppant carrying capacity, fluid loss control, and high viscosity. As a result, a variety of fracturing fluids have been developed and used, including foamed fracturing fluids. Foamed fracturing fluids comprise a relatively large volume of gas dispersed in a relatively small volume of liquid and a surfactant for facilitating the foaming and stabilization of the foam produced when the gas is mixed with the liquid. The most commonly used gases for foamed fracturing fluids are nitrogen and carbon dioxide because they are non-combustible, readily available, and relatively cheap.

The procedure used to fracture a subterranean formation with a foamed fracturing fluid includes pumping the foamed fracturing fluid into a well at a pressure sufficient to fracture the formation. The pressure on the well is then relieved at the wellhead to reduce or defoam the fracturing fluid, releasing proppant suspended therein into the resulting fractures. This reduction of the pressure on the foam results in the fluid being carried back into the well by the rush of expanding gas. The proppant must be properly placed in the formation to adequately increase production flow from the formation. However, controlling the defoaming of the fracturing fluid to properly release the proppant can be difficult. A need therefore exists to develop an improved technique for defoaming the fracturing fluid.

SUMMARY OF THE INVENTION

According to an embodiment, methods of fracturing a subterranean formation include providing a fracturing fluid having a first pH. In an embodiment, the fracturing fluid may be made by combining a gelling agent and a surfactant to form a mixture having the first pH. A proppant may also be combined with the gelling agent and the surfactant. The surfactant is capable of facilitating foaming of the fracturing fluid at the first pH and defoaming of the fracturing fluid when its pH is changed to a second pH. The methods of fracturing the subterranean formation further include foaming the fracturing fluid having the first pH and subsequently pumping it to the subterranean formation to fracture the formation. In an embodiment, the pH of the fracturing fluid changes to a second pH in situ in the subterranean formation, causing the level of foam in the fracturing fluid to be reduced. In an embodiment, the subterranean formation comprises coal-bed methane and the pH of the fracturing fluid is reduced via contact with a naturally occurring acidic water. As a result of the reduction of the foam, the fracturing fluid deposits the proppant into the fractures formed in the subterranean formation. The fracturing fluid is returned to the surface, where it may be recovered, re-foamed by changing its pH back to the first pH, and injected downhole.

DETAILED DESCRIPTION OF THE PREFERRED EMBODIMENTS

According to an embodiment, fracturing fluids for fracturing a subterranean formation comprise a surfactant, a gelling agent, water, and a proppant. The surfactant enables the fracturing fluids to be foamed at a first pH and defoamed at a second pH. A foamed fracturing fluid is herein defined as a fracturing fluid that contains gas dispersed in a liquid, wherein the volume of gas depends on the quality of the foam, which is directly proportional to the half-life of the foam. The fracturing fluid can be foamed and defoamed by simply changing its pH. Moreover, once the fracturing fluid has been foamed, it undergoes a change in pH, for example upon in situ contact with a naturally occurring material in the subterranean formation that is sufficient to cause its pH to change. As such, the fracturing fluid typically does not require the addition of substances such as gelling agent breakers (e.g., enzymes and oxidizing agents), acids, acid producing compounds, bases, or base producing compounds to foam and defoam the fluid. In an embodiment, the naturally occurring material is acidic water that is formed by contact of water with acidic clay such as chlorite, illite, smectite, and combinations thereof. Additional information regarding such acidic clays is provided in SPE 73730, "High pH Clay Instability Rating" and SPE 64983 "Impact of Clay Acidity on pH of Invading Fluids," each of which is incorporated herein in its entirety.

The particular pH at which the fracturing fluid can be foamed by the addition of a gas and the particular pH at which it undergoes defoaming depend on the nature of the surfactant. In an embodiment, the first pH and the second pH are each basic. In an embodiment, the first pH is at least about 11 and the second pH is greater than 7 and less than about 9. In an embodiment, the first pH at which the fracturing fluid foams is in the range of at least about 11 with a half-life of the fracturing fluid at the first pH greater than about 15, and the second pH at which the fracturing fluid defoams is in the range of less than about 9 with a half-life of the fracturing fluid at the second pH less than about 2. Without being limited by theory, it is believed that the surfactant facilitates the formation of foam when the fracturing fluid is at a first pH by reducing the surface tension between the gas and the liquid therein, thus promoting and stabilizing the gas-liquid dispersion. On the other hand, the surfactant facilitates reduction of the foam when the fluid is changed to a second pH. It is further theorized that at the second pH, the fracturing fluid does not have the ability to reduce the surface tension between the gas and the liquid.

One suitable surfactant that may be used in the fracturing fluid is a tertiary alkyl amine ethoxylates. The tertiary alkyl amine ethoxylates may be changed from a foaming surfactant (i.e., a surfactant that facilitates foaming of the fracturing fluid) to a defoaming surfactant (i.e., a surfactant that facilitates defoaming of the fracturing fluid) by the addition of a hydrogen ion. It may then be changed back to a foaming surfactant by the addition of a hydroxide ion. The following formula represents the ability of the tertiary alkyl amine ethoxylates to be changed from a foaming surfactant to a defoaming surfactant:

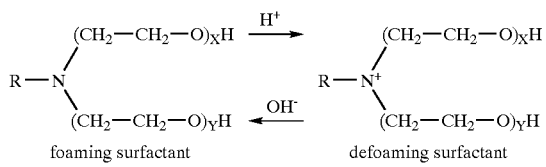

where R is an alkyl group or groups having from about 12 to about 14 carbon atoms and X and Y vary from about 2 to about 15 moles of ethylene oxide, preferably from about 10 to about 15 moles of ethylene oxide. Triton RW-100 surfactant (X and Y=10 moles of ethylene oxide) and Triton RW-150 surfactant (X and Y=15 moles of ethylene oxide) are examples of tertiary alkyl amine ethoxylates that may be purchased from Dow Chemical Company.

In another embodiment, the fracturing fluid comprises an amphoteric surfactant and an anionic surfactant. The relative amounts of the amphoteric surfactant and the anionic surfactant in the surfactant mixture are from about 32 to about 45% by weight of the surfactant mixture and from about 55 to about 68% by weight of the surfactant mixture, respectively. As used throughout the specification, "%" represents "percent." The amphoteric surfactant may comprise lauryl amine oxide, a mixture of laurylamine oxide and myristylamine oxide (laurylamine/myristylamine oxide), cocoamine oxide, lauryl betaine, oleyl betaine, cocoamido propyl betaine, or combinations thereof, with the laurylamine/myristylamine oxide being preferred. Such amine oxides are generally represented by the formula:

$R-N^+O^-$ where R is $C_{12}$ (lauryl), $C_{12-14}$ (lauryl/myristyl), or $C_{8-12}$ (coca). Further, such betaines are generally represented by the formula:

$R-N^+-CH_2-CH_2-COO^-$ where R is $C_{12}$ (lauryl) or $C_{18}$ (oleyl). Such amine oxides and betaines are commercially available from Chemron, a Lubrizol Co., of Paso Robles, Calif. The anionic surfactant may comprise $C_{4-12}$ alcoholether sulfate, α-olefin sulfonate, sulfonated $C_{15}$ alcohol substituted with from about 12 to about 40 moles of ethylene oxide, sodium lauryl-2-sulfate, sodium lauryl-3-sulfate, or combinations thereof, e.g., $C_{4-12}$ alcohol ether sulfate containing 1.5 to 3 moles of ethylene oxide combined with the α-olefin sulfonate ($C_{12-14}[OH]SO_3^-Na^+$), with the alcohol ether sulfate and the α-olefin sulfonate being preferred. The first pH at which the fracturing fluid comprising the amphoteric surfactant and the anionic surfactant foams is in the range of at least about 11. Also, the second pH at which the fracturing fluid defoams is in the range of less than about 9. When the fracturing fluid is formed, its pH is initially in the first pH range. Thus, it can be foamed and conveyed to a subterranean formation via a wellbore. As it passes downhole, it contacts an acidic material, such as acidic water, that causes its pH to lower to within the second pH range, resulting in a reduction of the foam.

In addition, the fracturing fluid includes a gelling agent, also known as a viscosifying agent. As used herein, "gelling agent" refers to a material capable of forming the fracturing fluid into a gel, thereby increasing its viscosity. The amount of the gelling agent present in the fracturing fluid preferably ranges from about 0.125 to about 0.375% by weight of the water. Examples of suitable gelling agents include, but are not limited to, natural or derivatized polysaccharides that are soluble, dispersible, or swellable in an aqueous liquid, modified celluloses and derivatives thereof, and biopolymers. Examples of polysaccharides include: galactomannan gums such as guar gum, locust bean gum, gum ghatti, gum karaya, tamarind gum, and tragacanth gum; depolymerized gums such as depolymerized guar gum; modified gums such as carboxyalkyl derivatives, e.g., carboxymethylguar, and hydroxyalkyl derivatives, e.g., hydroxyethyl guar, hydroxypropylguar, and carboxymethyl guar; and doubly derivatized gums such as hydroxypropyl carboxymethyl guar and hydroxyethyl carboxymethyl guar. Examples of water-soluble cellulose ethers include methylcellulose, carboxymethyl cellulose, hydroxyethyl cellulose, and hydroxyethyl carboxymethyl celluose. Examples of biopolymers include xanthan gum and welan gum.

Examples of other suitable gelling agents include, but are not limited to, water dispersible hydrophillic organic polymers having molecular weights ranging from about 100,000 to about 10,000,000 such as polyacrylamide and polymethacrylamide, wherein about 5% to about 7.5% are hydrolyzed to carboxyl groups and a copolymer of about 5% to about 70% by weight acrylic acid or methacrylic acid copolymerized with acrylamide or methacrylamide.

Examples of additional suitable gelling agents include, but are not limited to, water soluble polymers such as a terpolymer of an ethylenically unsaturated polar monomer, an ethylenically unsaturated ester, and a monomer selected from acrylamido-2-methylpropane sulfonic (AMPS) acid or N-vinylpyrrolidone; and a terpolymer of an ethylenically unsaturated polar monomer, an ethylenically unsaturated ester, AMPS acid, and N-vinylpyrrolidone. Other suitable gelling agents are polymerizable water soluble monomers, such as acrylic acid, methacrylic acid, acrylamide, and methacrylamide.

Preferred gelling agents include depolymerized guar gum, guar gum, locust bean gum, hydroxyethyl guar, hydroxypropyl guar, hydroxyethyl carboxymethyl guar, hydroxpropyl carboxymethyl guar, carboxymethyl guar, hydroxyethyl cellulose, hydroxyethyl carboxymethyl cellulose, carboxymethyl cellulose, methyl cellulose, xanthan gum, and welan gum. In an embodiment, the gelling agent is depolymerized guar gum prepared by subjecting hydroxypropyl guar to oxidative degradation with hydrogen peroxide. In an embodiment, the depolymerized guar gum prepared as a solution where the activity of the polymer ranges from 11–12%. A 2% solution by volume of the depolymerized guar gum in distilled water will yield a viscosity of from about 8 to 25 cp measured by a Fann 35 viscometer equipped with a ⅕ spring.

The amount of gelling agent present in the fracturing fluid is preferably in the range of from about 10 to about 30 pounds (lbs)/1,000 gallons (gal) of fracturing fluid. Additional disclosure regarding the foregoing gelling agents can be found in U.S. Pat. No. 6,454,008, which is incorporated by reference herein in its entirety.

The fracturing fluid is preferably a water-based composition having a balance of water after taking other components of the fracturing fluid into account. The fracturing fluid may contain produced water, fresh water or salt water such as brines and seawater. The amount of surfactant present in the water preferably ranges from about 0.5 to about 2.0% by weight of the water. The particular amount of the surfactant used in the fracturing fluid depends on the required degree of foam stability, which is directly proportional to the half-life of the foam.

A proppant for preventing fractures formed in the subterranean formation from closing may be disposed throughout the fracturing fluid. Examples of suitable proppants include, but are not limited to, resin coated or uncoated sand, sintered bauxite, ceramic materials, and glass beads. The proppant is preferably present in the fracturing fluid in an amount ranging from about 1 to about 10 pounds/gallon of the fluid, alternatively from about 5 to about 10 pounds/gallon of the fluid. A bacteriacide may also be added to the fracturing fluid for the purpose of preventing or alleviating a bacterial attack. Examples of suitable bacteriacides include, but are not limited to, glutaric aldehyde and hexahydro-1,3,6-tris (hydroxyethyl)-S-triazne. The concentration of the bactericide added to the fracturing fluid preferably ranges from about 0.1 to about 0.15 gallon of bactericide per 1,000 gallons of the water.

The fracturing fluid described above may be formed by combining its components, including the water, the surfactant, the gelling agent, and the proppant in any order. By way of example, the water may be combined with the gelling agent, followed by adding the surfactant to the resulting mixture. The proppant may then be added to the fracturing fluid before foaming the fluid.

In an embodiment, methods of fracturing a subterranean formation comprise providing a fracturing fluid having a first pH, foaming the fracturing fluid, and introducing the foamed fracturing fluid into a subterranean formation to fracture the formation. The pH of the fracturing fluid changes to a second pH, preferably in situ in the subterranean formation via contact with a naturally occurring acidic material, causing the level of foam in the fracturing fluid to be reduced downhole. Alternatively, an acidic material may be introduced into the formation prior to, concurrent with, or subsequent to introduction of the foamed fracturing fluid to achieve the desired change in pH and resultant defoaming. It is understood that "subterranean formation" encompasses both areas below exposed earth or areas below earth covered by water such as sea or ocean water.

The fracturing fluid may be foamed by adding gas to the fracturing fluid while pumping it into a wellbore that penetrates the subterranean formation. The gas may be, for example, nitrogen. The foamed fracturing fluid is pumped to the subterranean formation at a pump pressure sufficient to exceed the fracturing gradient and start fracturing the subterranean formation. The fracturing fluid can be pumped downhole for a period of time sufficient to achieve a desired amount of fracture geometry in the subterranean formation. A proppant may be combined with the fracturing fluid before pumping it downhole such that the proppant becomes suspended in the foam. As the fracturing fluid passes into the formation, it comes into contact with a downhole material that causes the pH of the fracturing fluid to change to a second pH in the formation. This change in the pH of the fracturing fluid in turn causes its viscosity to be reduced, resulting in the dissipation of the foam in the fracturing fluid. Due to the static condition of the defoamed fracturing fluid and to gravity, the proppant begins settling such that it becomes deposited in the fractures of the subterranean formation. As such, the proppant can hold the fractures open during the subsequent production of oil, water, or gas from the formation.

After completing the fracturing of the subterranean formation, the fracturing fluid may be flowed back to the surface. At the surface, the fracturing fluid can be passed to a holding tank or vessel, and its pH can be changed back to the first pH at which the fluid foams by the addition of a gas. The fracturing fluid can then be re-foamed and recycled to the same or a different subterranean formation to fracture that formation as described previously.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Examples 1 and 2

The following procedure was followed in both Examples 1 and 2: a fracturing fluid was prepared by blending 880 mL of distilled water and 120 mL of depolymerized hydroxypropyl guar gum, i.e., the gelling agent, until the gelling agent was fully hydrated. The resulting solution had a viscosity of 9.1 centipoise, as determined using a FANN 35 viscometer equipped with a ⅕ spring. Next, 100 mL of the solution was poured into a 1 L blendor jar marked at 100 mL increments. About 0.5%, of tertiary alkyl amine ethoxylate with 10 moles of ethylene oxide, i.e., the surfactant, based on the total volume of the water was then added to the solution. The initial pH of the mixture was measured to be 11.39. The blendor was then operated at a very low blendor speed to slowly build foam in the mixture. The blendor speed was then increased to generate a stable foam having a fine texture. The mixture was blended in this manner until the maximum foam height had been achieved. The foamed fluid was then transferred to a 500 mL graduated cylinder, and a stop watch was simultaneously started. The total volumes of the fluid and of the foam were measured and recorded. Further, the fluid was observed as its volume fell, and the pH of the fluid was monitored during this time. When the volume reached the 50 mL mark, the stop watch was stopped and recorded as the half-life of the foam. The foam quality was calculated using the following formula:

$$\text{Foam Quality} = \frac{\text{Total Volume of Foam} - \text{Liquid}}{\text{Total Volume of Foam}} \times 100$$

Subsequently, the pH of the fracturing fluid was lowered to various pH values, causing the foam to dissipate. The pH of the fluid was again raised to near its original pH, and the fluid was foamed again in the manner described previously, resulting in the formation of a stable foam. As shown in Table 1 below, the half-life and the foam quality were measured after each change in pH.

TABLE 1

| Example | Surfactant Concentration, gal/M gal | Viscosity of Base Gel, cP | pH of Fluid | Foam Quality | Half-Life |
|---|---|---|---|---|---|
| 1 | 5 | 9.1 | 11.39 | 72 | 18:40 |
|   | 5 | 9.1 | 6.8 | 0 | 0 |
|   | 5 | 9.1 | 8 | 62 | 2:00 |
|   | 5 | 9.1 | 9 | 72 | 16:02 |
|   | 5 | 9.1 | 11.47 | 72 | 16:01 |
| 2 | 5 | 9.1 | 11.46 | 72 | 16:50 |
|   | 5 | 9.1 | 7 | 44 | 0:30 |
|   | 5 | 9.1 | 8 | 62 | 13:22 |
|   | 5 | 9.1 | 9 | 71 | 17:16 |
|   | 5 | 9.1 | 11.41 | 72 | 16:22 |

Table 1 indicates that the quality and the half-life of the foam were initially high when the pH of the fluid was above 11 in both Examples 1 and 2. However, the fluid experienced large drops in the half-life and the foam quality when its pH was lowered to 6.8 in Example 1 and to 7 in Example 2. The quality and the half-life of the foam increased when the pH of the fluid was raised to 8, and they increased even more when the pH of the fluid was raised to 9. Then when the pH of the fluid was raised to above 11 again, the half-life and the foam quality reached about what they were originally.

Examples 3 and 4

The procedure followed in Examples 1 and 2 was followed in these examples except that the surfactant employed in the fracturing fluid was tertiary alkyl amine ethoxylate with 15 moles of ethylene oxide. Table 2 below provides the results of these examples.

TABLE 2

| Example | Surfactant Concentration, gal/M gal | Viscosity of Base Gel, cP | pH of Fluid | Foam Quality | Half-Life |
|---|---|---|---|---|---|
| 3 | 5 | 9.1 | 11.39 | 71 | 16:51 |
|   | 5 | 9.1 | 7 | 41 | 1:07 |
|   | 5 | 9.1 | 8 | 57 | 5:31 |
|   | 5 | 9.1 | 9 | 71 | 17:03 |
|   | 5 | 9.1 | 11.4 | 74 | 15:39 |
| 4 | 5 | 9.1 | 11.49 | 72 | 19:14 |
|   | 5 | 9.1 | 7 | 38 | 1:33 |
|   | 5 | 9.1 | 8 | 62 | 11:05 |
|   | 5 | 9.1 | 9 | 72 | 19:12 |
|   | 5 | 9.1 | 11.46 | 72 | 18:27 |

Table 2 illustrates that the quality and the half-life of the foam were initially high when the pH of the fluid was above 11 in both Examples 3 and 4. However, the fluid experienced large drops in the half-life and the foam quality when its pH was lowered to 7. The quality and the half-life of the foam increased when the pH of the fluid was raised to 8. Further, they increased even more, reaching about what they were originally, both when the pH of the fluid was raised to 9 and when it was raised to above 11.

While the preferred embodiments of the invention have been shown and described, modifications thereof can be made by one skilled in the art without departing from the spirit and teachings of the invention. The embodiments described herein are exemplary only, and are not, intended to be limiting. Many variations and modifications of the invention disclosed herein are possible are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of fracturing a subterranean formation, comprising the steps of:

(a) providing a fracturing fluid having a first pH;

(b) foaming the fracturing fluid;

(c) introducing the foamed fracturing fluid into a subterranean formation to fracture the subterranean formation; and (d) defoaming the fracturing fluid by changing the pH of the fracturing fluid to a second pH in situ in the subterranean formation.

2. The method of claim 1 wherein the change in pH is achieved via contact with an acidic material.

3. The method of claim 2 wherein the acidic material is naturally occurring.

4. The method of claim 3 wherein die acidic material is clay.

5. The method of claim 3 wherein the acidic material is acidic water.

6. The method of claim 1 wherein the first pH and the second pH are each basic, the second pH being less basic than the first pH.

7. The method of claim 1 wherein the fracturing fluid is foamed with nitrogen.

8. The method of claim 1 wherein the fracturing fluid deposits a proppant in fractures formed in the subterranean formation when the foam is reduced.

9. The method of claim 1 wherein the fracturing fluid comprises a surfactant that facilitates formation of the foam at the first pH and that facilitates reduction of the foam at the second pH.

10. The method of claim 9 wherein the surfactant is a tertiary alkyl amine ethoxylate generally represented by the following formula when the pH of the fracturing fluid is the first pH:

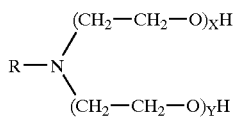

wherein R is an alkyl group or groups, X is ethylene oxide, and Y is ethylene oxide.

11. The method of claim 10 wherein X is from about 2 to about 15 moles of the ethylene oxide.

12. The method of claim 10 wherein Y is from about 2 to about 15 moles of the ethylene oxide.

13. The method of claim 10 wherein X is from about 10 to about 15 moles of the ethylene oxide.

14. The method of claim 10 wherein Y is from about 10 to about 15 moles of the ethylene oxide.

15. The method of claim 10 wherein the first pH is at least about 11 with a half-life of the fracturing fluid at the first pH of greater than about 15.

16. The method of claim 9 wherein the surfactant is a tertiary alkyl amine ethoxylate generally represented by the following formula when the pH of the fracturing fluid is the second pH:

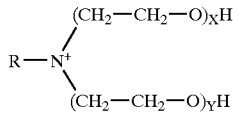

wherein R is an alkyl group or groups, X is ethylene oxide, and Y is ethylene oxide.

17. The method of claim 16 wherein X is from about 2 to about 15 moles of the ethylene oxide.

18. The method of claim 17 wherein the second pH is less than about 9.

19. The method of claim 16 wherein Y is from about 2 to about 15 moles of the ethylene oxide.

20. The method of claim 16 wherein X is from about 10 to about 15 moles of the ethylene oxide.

21. The method of claim 16 wherein Y is from about 10 to about 15 moles of the ethylene oxide.

22. The method of claim 16 wherein the second pH is less than about 9 with a half-life of the fracturing fluid at the second pH of less than about 2.

23. The method of claim 9 wherein the surfactant comprises an amphoteric compound and an anionic compound.

24. The method of claim 23 wherein the amphoteric compound comprises laurylamine oxide, myristylamine oxide, cocoamine oxide, lauryl betaine, cocoamido propyl betaine, oleyl betaine, or combinations thereof.

25. The method of claim 23 wherein the anionic surfactant comprises $C_{4-12}$ alcoholether sulfate, $\alpha$-olefin sulfonate, sulfonated $C_{15}$ alcohol, sodium lauryl-2-sulfate, sodium lauryl-3-sulfate, or combinations thereof.

26. The method of claim 25 wherein the sulfonated $C_{15}$ alcohol is substituted with from about 12 to about 40 moles of ethylene oxide.

27. The method of claim 23 wherein the first pH is at least about 11.

28. The method of claim 1 wherein the fracturing fluid comprises a gelling agent.

29. The method of claim 28 wherein the gelling agent comprises depolymerized hydroxypropyl guar, hydroxypropyl guar, guar gum, locust bean gum, hydroxyethyl guar, hydroxyethyl carboxymethyl guar, hydroxypropyl carboxymethyl guar, carboxymethyl guar, hydroxyethyl cellulose, hydroxyethyl carboxymethyl cellulose, carboxymethyl cellulose, methyl cellulose, xanthan gum, welan gum, or combinations thereof.

30. The method of claim 28 wherein the gelling agent comprises depolymerized hydroxypropyl guar.

31. The method of claim 1 wherein the subterranean formation comprises a coal bed.

32. The method of claim 31 wherein the coal bed comprises methane.

33. The method of claim 1, further comprising the steps of recovering the fracturing fluid, re-foaming the fracturing fluid, and injecting the foamed fracturing fluid downhole.

34. A method of fracturing a subterranean formation, comprising the steps of;

(a) providing a fracturing fluid having a first pH;

(b) foaming the fracturing fluid; and (c) introducing the foamed fracturing fluid into a subterranean formation to fracture the subterranean formation; and (d) defoaming the fracturing fluid by changing the pH of the fracturing fluid to a second pH, wherein the first pH and the second pH are each basic, the second pH being less basic than the first pH.

35. A method of making a fracturing fluid, comprising: combining a gelling agent and a surfactant to form a mixture having a first pH, wherein the surfactant is capable of facilitating foaming of the fracturing fluid at the first pH and defoaming of the fracturing fluid when its pH is changed to a second pH.

36. A fracturing fluid made by the method of claim 35.

* * * * *